United States Patent
Hawkins

Patent Number: 6,032,540
Date of Patent: Mar. 7, 2000

[54] IN-LINE, FIELD ADJUSTABLE IRRIGATION FLOW INDICATOR FOR HIGH, NORMAL AND LOW FLOW RATES

[75] Inventor: Stanley E. Hawkins, Visalia, Calif.

[73] Assignee: Agrilcultural Products Inc., Ontatio, Calif.

[21] Appl. No.: 09/049,684

[22] Filed: Mar. 27, 1998

[51] Int. Cl.[7] .............................. G01F 1/28; G01F 15/00; G01D 11/06

[52] U.S. Cl. ................................... 73/861.75; 73/861.74; 116/274; 116/291

[58] Field of Search .......................... 73/861.71, 861.72, 73/861.73, 861.74, 861.75, 861.77, 861.78; 116/264, 267, 274, 276, 291, DIG. 7, 277; 137/521, 554, 553, 557

[56] References Cited

U.S. PATENT DOCUMENTS

| | | |
|---|---|---|
| 2,029,633 | 2/1936 | Muhleisen . |
| 2,461,351 | 2/1949 | Silverman ............................ 73/861.75 |
| 2,600,309 | 6/1952 | MacDonald et al. . |
| 3,085,432 | 4/1963 | Bloom ................................. 73/861.75 |
| 3,224,270 | 12/1965 | Karol et al. . |
| 3,251,335 | 5/1966 | Dannevik ................................. 116/273 |
| 3,452,169 | 6/1969 | Ruxton ................................. 73/861.75 |
| 3,559,197 | 1/1971 | Jarvis et al. . |
| 3,857,277 | 12/1974 | Moore . |
| 3,914,994 | 10/1975 | Banner ................................. 73/861.75 |
| 4,101,874 | 7/1978 | Denison et al. . |
| 4,132,237 | 1/1979 | Kennedy et al. . |
| 4,596,442 | 6/1986 | Anderson et al. . |
| 4,603,707 | 8/1986 | Gregoire et al. . |
| 4,791,254 | 12/1988 | Polverari ............................ 73/861.74 |
| 4,827,092 | 5/1989 | Kobold ................................. 73/861.74 |
| 4,906,807 | 3/1990 | Siebert et al. ...................... 73/861.75 |
| 4,931,776 | 6/1990 | Klos et al. . |
| 4,963,857 | 10/1990 | Sackett . |
| 5,021,619 | 6/1991 | Hutchinson ........................ 73/861.74 |
| 5,203,365 | 4/1993 | Velie . |
| 5,410,298 | 4/1995 | Wiseman . |
| 5,582,201 | 12/1996 | Lee et al. . |

Primary Examiner—Benjamin R. Fuller
Assistant Examiner—Robin Clark
Attorney, Agent, or Firm—Daniel L. Dawes

[57] ABSTRACT

An in-line flow meter for use in drip irrigation systems which provides a field adjustable, infinitely variable visual flow indication of both high and low flow rates above and below a field adjustable normal flow rate is provided by means of a drag paddle rotatably disposed in the flow in the fluid conduit. The paddle carries a magnet and an indicator lever exterior to the conduit carries a second magnet which interacts with the magnet on the paddle. The paddle which hangs downwardly into the flow, and rotates upwardly and downwardly depending on whether the flow increases or decreases. The exterior indicator lever similarly rotates to mimic or telegraph the angular orientation of the paddle through the interaction of the two magnets. An adjustable counterweight is provided on or as the exterior indicator lever and can be positioned so that the indicator lever is approximately level or aligned with a fixed shield when the predetermined flow is achieved.

21 Claims, 11 Drawing Sheets

Fig. 8

IN-LINE, FIELD ADJUSTABLE IRRIGATION FLOW INDICATOR FOR HIGH, NORMAL AND LOW FLOW RATES

BACKGROUND OF THE INVENTION

1. Field of the Invention

The invention relates to the field of flow indicators and in particular to a flow indicator used in drip irrigation systems, which flow indicator is capable of providing a visual indication of high, normal and low flow rates, which flow indicator is field adjustable, and which flow indicator uses a magnetic transmitting means to transmit a signal indicative of flow to a visual indicator.

2. Description of the Prior Art

It is necessary to know the flow rate in a drip irrigation system since large acreages may be drip irrigated with thousand of yards or even miles of lines. Even with the best of filtering precautions, some water borne debris will be inserted from the water source into the lines, which will tend to accumulate at the distal ends of the submains. Back suction will tend to also draw dirt and debris from the emitters into the lines or to clog the emitters every time the system is turned off. In some applications lime deposits can build up over time just as in building water distribution plumbing. As the flow rate slowly decreases a portion of the crop will become underwatered resulting in lowered production and even possible crop loss through dehydration or disease.

In drip irrigation systems the lines are very light gauge and can be easily torn or cut with even a dull edge. Contact with agricultural equipment or tools can easily sever a line without this fact being immediately noticed. Drip lines are also susceptible to damage by animals, such as coyotes, gophers and other rodents, which will chew the lines in mistaken identification of food. Therefore, emitters or small lines can easily open up and be unnoticed if the flow rate is not scrupulously watched. A portion of the crop will be over watered not only resulting in wasted expensive water, but in loss of fruit or root production through the production of excess vegetative growth or crop loss through disease.

As a result flow rate in extensive commercial drip irrigation systems is carefully monitored, as often as not by expensive remotely telemetered electronic flow meters. While the use of such meters may be economically feasible for the mains, the flow rate in the submains and smaller lines must also be monitored since damage typically occurs locally and the flow in every locality must be known.

Moore, "*Flow Indicator*," U.S. Pat. No. 3,857,277 (1974) is directed to a flow indicator as shown in FIGS. 1–3 of that reference. The flow indicator 10 comprises a housing 12 which has a chamber 14 therein and includes an inlet opening 16 and an outlet opening 18 which respectively communicate with opposite ends of the chamber. A flexible flap 20 hingedly supported on the housing within the chamber 14 is disposed in the path of fluid flow from the inlet opening 16 to the outlet opening 18 for flexure about generally parallel axes and generally toward the outlet opening in response to fluid flow through the housing. A permanent magnet 22 carried by the flap 20 actuates at least one magnetically responsive switch 24 supported by the housing and adapted for connection in an external electrical circuit to operate an indicator or alarm or to operate relays or the like to provide automatic system control. The switch 24 is within the magnetic influence of the magnet 20 during at least a portion of flexure movement of the flap 20 toward the outlet opening 18. The housing 12 is provided with a transparent observation port through which the relative position of the flap 20 may be viewed.

Anderson et,.al., "*Fiberoptic Flow Indicator System*," U.S. Pat. No. 4,596,442 (1986) is directed to a fiber optic flow indicator system having a first magnetic member 14 comprises an elongate member 54, a magnet 56, and a paddle 58. First magnetic member 14 is pivotally mounted about point 60 to body member 12. Elongate member 54 extends from pivot 60 downward and beyond end 64 of body member 12. A spring 66 extends from sleeve 62 downwardly to stop 68 about the outer surface of elongate member 54. Spring 66 causes the elongate member 54 to return to an original position. Second magnetic member 16 comprises a magnet 72, a casing 74, an arm 76, and a reflective surface 78. Second magnetic member 16 is pivotally mounted to slotted member 46 about point 80. Second magnetic member 16 is pivotally mounted so as to allow the free rotation of the second magnetic member about pivot point 80. In operation, the reflective surface 78 will move in relation to the existence or absence of fluid flow acting on paddle 58. Since magnets 56 and 72 have their north poles adjacent each other, these magnets act to repel each other.

Muhleisen, "*Flow Indicator*", U.S. Pat. No. 2,029,633 (1936) is directed to a flow indicator having a generally rectangular clapper 14 of magnetized material disposed in the fluidway 13 and pivoted by means of a detachable pin 15 from the lugs 9 or 10, according to the direction of flow. Door 16 is made of diamagnetic opaque material, and it closes the lateral opening provided in the casing, thus completely enclosing the fluidway against possible leakage. In the space between the door and glass 16a, is an indicator 19 of magnetic material. The indicator is pivotally supported by a pin 20, aligned with the pin 15, and projecting from the door 16. The indicator is counterbalanced by a weight 23 applied to the arm 21. The indicator confronts the edge of the clapper 14 and is substantially equal in length with that edge. In use, the clapper 14 is turned and positioned by the flow of liquid through the casing and since it and the indicator are of magnetic material, and since one of them, the clapper in the present instance, is magnetized, the indicator follows the movement of the clapper and shows the condition of flow of the liquid.

Klos et.al, "*Fluid Flow Sensor with Flexible Vane*," U.S. Pat. No. 4,931,776 (1990) is directed to a fluid flow sensor with flexible vane as shown in FIG. 1 within the cavity 16. A vane assembly 22 of thin welded metal is attached to the housing 10 with screws 24 and nuts 26. A first electrical connection tab 28 is attached to one of the screws 24 on the outside of the housing 1 0 to provide an electrical connection point to the vane assembly 22. A second electrical connection tab 32 is held on with the set screw 30 with a nut 34. In operation, the sensor is connected serially in a fluid flow line. As the flow rate through the sensor is increased from zero, at some first limit point, called the flow rate at closing, it becomes sufficient to elastically bend vane 22 to contact set screw 30, so that an electrical connection path is made from the first tab 28 through screw 24, vane 22 and set screw 30 to second tab 32.

Karol et.al., "*Flow Gauges*," U.S. Pat. No. 3,224,270 (1965) is directed to flow gauges with a permanent magnet for signaling. A permanent magnet 22 is disposed within the passageway 13 and is adapted to be moved by the fluid when the latter is flowing through the conduit 12. In the presence of a fluid flow, the magnet 22 is moved in the direction of the outward taper of the conduit 12 to a position determined by a condition of equilibrium between the force of gravity and the force provided by the fluid flow. A plurality of magnetically operated read switches 28–42 are disposed sequentially along the outer wall 44 of the conduit 12, the switch 28 being adjacent the magnet 22 when the latter is in its rest position. As shown in FIG. 4, to overcome the force of gravity on the gate 71a, the gate is resiliently connected to a wall of the conduit 12a by springs 88 and 90, the latter being fixed to the opposite sides of the gate 71a and to the wall of the conduit 12a by any suitable means and may be counterbalanced dynamically, by any suitable means, as by counterweights which are not shown.

Large scale drip irrigation systems, such as used for drip irrigation of timber grown for paper pulp production, typically employs drip irrigation lines extending up to 660 feet or more arranged in networks covering tens to hundreds of acres. These lines must be inspected and maintained to determine both whether the drip lines are clogged or breached. Therefore, some type of means must be provided to measure both high and flow rates indicating breached or clogged drip lines. Further, the indicator must be simple, rugged, reliable, inexpensive to manufacture, easy to maintain, and easily visually inspected. The indicator must provide some type of visual indication in the field of either high or low flow rates. Ideally, the flow indication must be such that a worker can check the indicator quickly and unambiguously as he passes by on a motorized vehicle. Thus, the indicator must be of such a nature that if unambiguous visual indication of high, normal or low flow rates can be made on site within seconds or less.

What is needed is a flow meter that can be adjusted in the field to compensate for normal point-to-point system variations, is simple, rugged, inexpensive, reliable, and capable of given a quick, easily observable indication in the field of high, normal or low flows with the range of flow rates and pressures typically used in drip irrigation systems.

BRIEF SUMMARY OF THE INVENTION

The invention is a flow meter which is comprised of a body or pipe segment for providing a conduit of fluid or water flow in a drip irrigation system, although the meter could be applied in any piping system in which a quick visual field indication of high, normal or low flow levels are needed. The meter comprises a rotatable paddle or lever which is disposed in the fluid flow within the body. A permanent magnet is disposed on the paddle. A rotatable indicator is disposed outside of the body. A second permanent magnet is disposed on the indicator. The second permanent magnet is positioned and oriented on the indicator to magnetically oppose the permanent magnet disposed upon the paddle so that the position of the paddle within the flow within the body is followed or mimicked by the position of the indicator exterior to the body.

The rotatable paddle has an arm with opposing ends and a paddle surface provided at one end. The paddle includes a pivotal coupling positioned at opposing end of the arm. The pivotal end of the arm is rotatably coupled to an interior upper surface of the body or pipe segment. The paddle surface which is disposed in the flow for fluid drag is shovel-shaped. The shovel-shape paddle surface has a leading faceted surface oriented towards the flow within the body.

The indicator comprises an indicator arm having opposing ends to which one of the ends the second permanent magnet is disposed. The indicator is pivoted at a point between the two ends. The indicator further comprises a counterweight coupled to the arm for balancing the second permanent magnet. The counterweight is coupled to the arm on the side of the pivoted coupling opposing the second magnet. The counterweight is field adjustable so that the indicator may be adjusted to assume a predetermined position in response to a corresponding predetermined flow within the body.

The counterweight is adjusted so that the arm is approximately parallel with the body when a predetermined normal flow within the body is achieved.

In another embodiment the flow meter further comprises a fixed indicia scale disposed on the body and positioned relative to the indicator to provide a visual quantitative continuous readout of position of the indicator.

In still another embodiment the flow meter further comprises a protective transparent cover disposed on the body to enclose and protect the indicator while permitting visual observation thereof.

The invention can alternatively be defined as an in-line flow meter comprising a cylindrical segment for receiving fluid flow and a paddle pivoted on one end and disposed within the cylindrical segment within the flow in the segment. The pivoted paddle has a permanent magnet disposed on its lower end opposing the pivoted end and assumes an angular orientation with respect to the pivoted end dependent upon the magnitude of flow within the cylindrical segment. A sensor arm is mounted on the cylindrical segment exterior to the interior of the cylindrical segment and is pivoted between its two opposing ends. One of the ends has a second permanent magnet disposed thereon in a position of magnetostatic interaction with the first permanent magnet disposed on the paddle so that the sensor arm assumes a position about its pivot in response to the position of the paddle within the cylindrical segment, thereby indicating flow rate within the in-flow flow meter.

The in-line flow meter further comprises a counterweight and indicator coupled to the sensor arm. The counterweight and indicator is adjustable in the field to allow orientation of the counterweight and indicator about its pivot to be adjusted to a predetermined orientation of the paddle corresponding to a predetermined flow rate within the cylindrical segment. The invention is also defined as a method of providing an in-line flow rate visual indication comprising the steps of flowing fluid in a conduit past a first pivoted lever disposed in the flowing fluid. The first pivoted lever has a flow resisting surface at one end and is pivoted to the conduit at an opposing end of the first pivoted lever. The first pivoted lever is rotated about the pivot depending upon magnitude of flow within the conduit. The first pivoted lever has at least in part a permanent magnetic portion or a separate permanent magnet attached thereto. A second pivoted lever disposed exterior to the conduit and having a second permanent magnetic portion is rotated in response to rotation of the first pivoted lever to provide a visual indication of magnitude of flow within the conduit. The second pivoted lever is capable of assuming at least two positions indicative of minimal and maximal flow within the conduit.

The method further comprising the step of adjusting a counterweight on the second pivoted lever so that the second pivoted lever assumes an identifiable physical position corresponding to a predetermined flow rate within the conduit.

In the illustrated embodiment in the step of rotating the second pivoted lever, a repulsive magnetic force is exerted between the magnetic portions of the first and second pivoted levers.

In another embodiment an attractive magnetic force is exerted between the magnetic portions of the first and second pivoted levers.

More particularly, the invention is defined as a flow meter comprising a body for providing a conduit for fluid flow, a first rotatable lever disposed in the fluid flow within the body, a permanent magnet disposed on the first lever and a second rotatable lever disposed outside of the body. A second permanent magnet is disposed on the second lever. The second permanent magnet is positioned and oriented on the second lever to magnetically oppose the permanent magnet disposed upon the first lever so that the position of the first lever within the flow within the body is followed by the position of the second lever exterior to the body. An adjustable third lever rotatably coupled to the second lever to provide a visual indication of position of the second lever and to provide an adjustable counterbalance thereto. A shield is provided as a visual alignment indicator with the third lever.

The invention, now having been briefly summarized, can be better visualized by turning to the following drawings where like elements are referenced by like numerals.

The invention in its various embodiments may now be understood by turning to the following detailed description.

DETAILED DESCRIPTION OF PREFERRED EMBODIMENTS

An in-line flow meter for use in drip irrigation systems which provides a field adjustable, infinitely variable visual flow indication of both high and low flow rates above and below a field adjustable normal flow rate is provided by means of a drag paddle rotatably disposed in the flow in the fluid conduit. The paddle carries a magnet and an indicator lever exterior to the conduit carries a second magnet which interacts with the magnet on the paddle. The paddle which hangs downwardly into the flow, and rotates upwardly and downwardly depending on whether the flow increases or decreases. The exterior indicator lever similarly rotates to mimic or telegraph the angular orientation of the paddle through the interaction of the two magnets. An adjustable counterweight is provided on or as the exterior indicator lever and can be positioned so that the indicator lever is approximately level or aligned with a fixed shield when the predetermined flow is achieved.

Figure 1A:
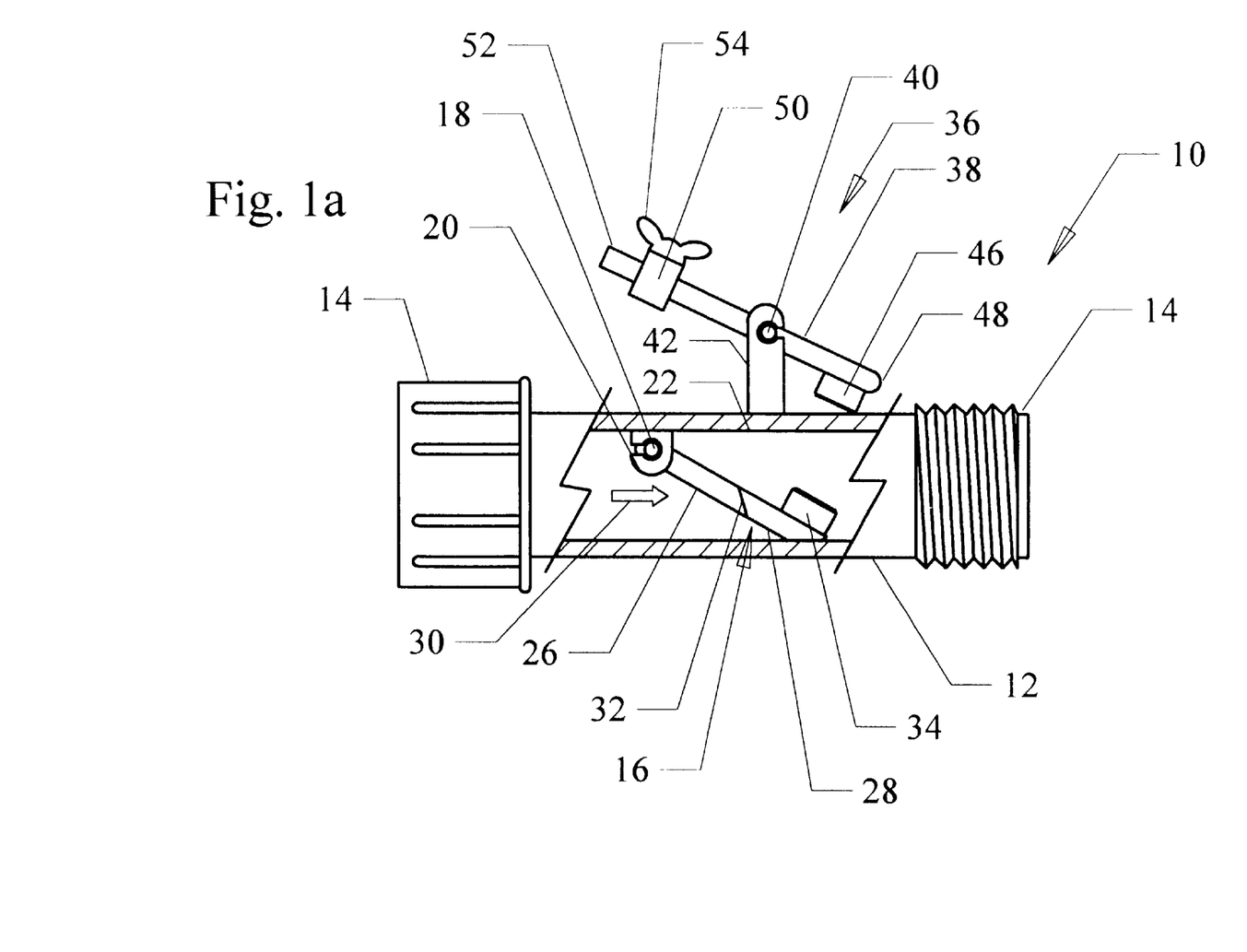
FIG. 1a is a side elevational view of a first embodiment of the flow meter shown in a no or low-flow condition.

FIG. 1a is a side elevational view of the in-line flow meter 10 of the invention. Flow meter 10 is shown as comprised of a straight cylindrical body 12, having two opposing fittings 14 at opposing ends of body 12. Fittings 14 are used to couple to a supply line in a drip irrigation system and may include any type of fitting or coupling adaptable for that purpose. In the preferred embodiment, threaded hose fittings are used.

Figure 4:
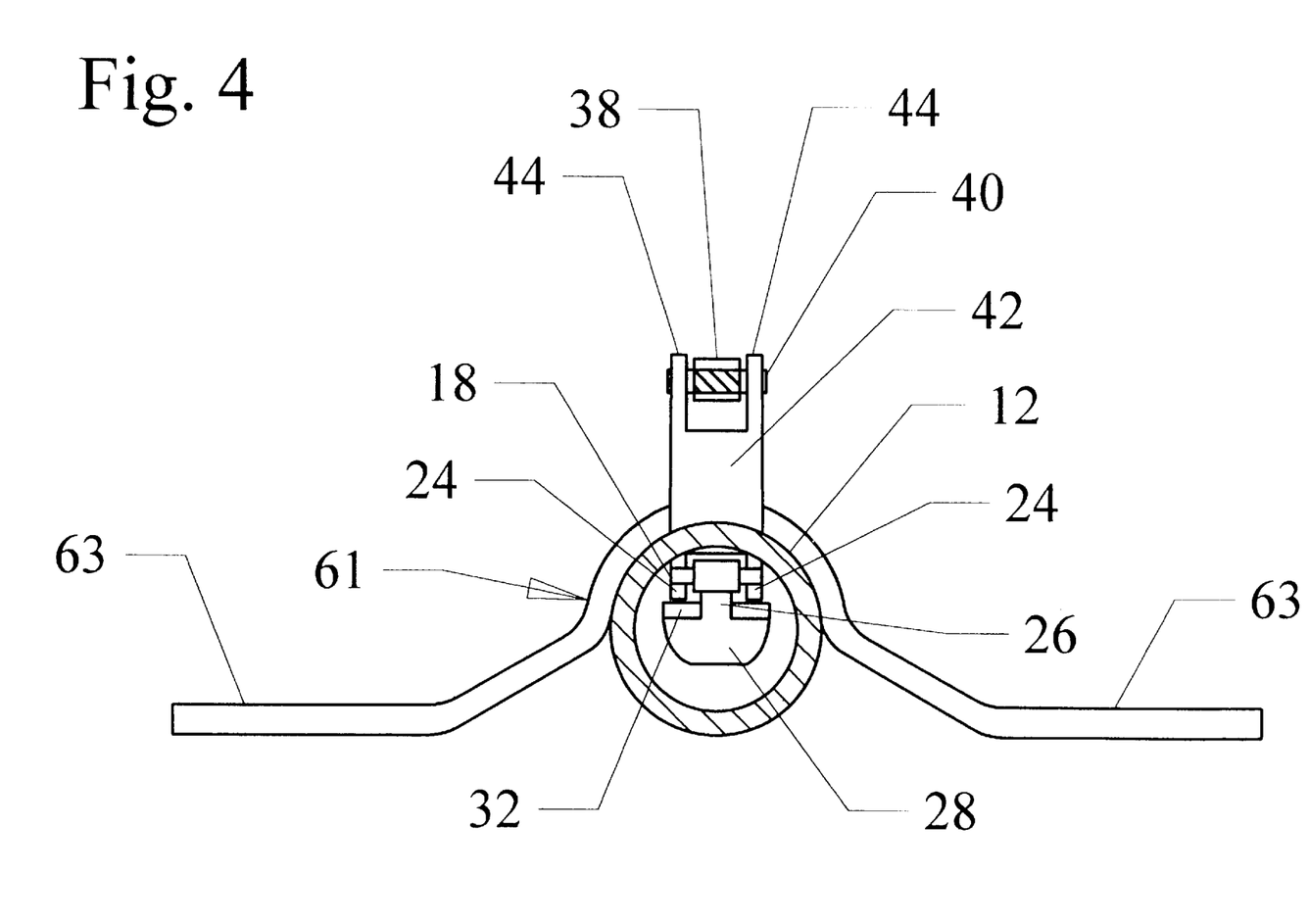
FIG. 4 is a perspective cross-sectional view of the flow meters of FIGS. 1a and b–3a and b as seen through section lines 4—4 of FIG. 3.

Body 12 is a hollow cylindrical pipe segment, such as made from rigid plastic, as shown in cross-sectional view in FIG. 4. Disposed within body 12 is a flow paddle generally denoted by reference 16. Flow paddle 16 is pivotally coupled at pivot pin 18 to a fitting 20 descending from the upper wall 22 of body 12. As shown in the cross-sectional view of FIG. 4, fitting 20 is comprised of 2 descending flanges 24 spanned by pivot pin 18. An arm 26 of flow paddle 16 is coupled to and rotates at one end about pivot pin 18. Arm 26 extends from pivot 18 to paddle surface 28. Paddle surface 28 may have any shape desired consistent with the teachings of the present invention and provides the primary flow impinging surface within body 12. Fluid or water flowing in the direction of arrow 30 strikes paddle surface 28, causing flow paddle 16 to rotate in a counter-clockwise direction as shown in FIG. 1a. In the illustrated embodiment, the paddle has a shovel shape, though again the impinging surface shape may be modified according to the range of flow rates encountered within body 12, and according to the sensitivity or magnitude of the angle of deflection of flow paddle 16 desired with respect to flow the rate. In the illustrated embodiment an upper facet 32 of flow paddle surface 28 is angled to form a leading contact surface of flow paddle 16 with flow 30. Surface 32 acts as a stabilizing bow of paddle surface 28 to the passing water flow.

The opposing side of paddle surface 28 is provided a permanent magnet 34. Magnet 34 in the illustrated embodiment has a cylindrical section having its magnetic axis located approximately perpendicular to paddle surface 28 or coincident with the axis of symmetry of the cylindrical segment. In the preferred embodiment magnet 34 is a ceramic magnet and is slightly inset into surface 28.

Figure 2A:
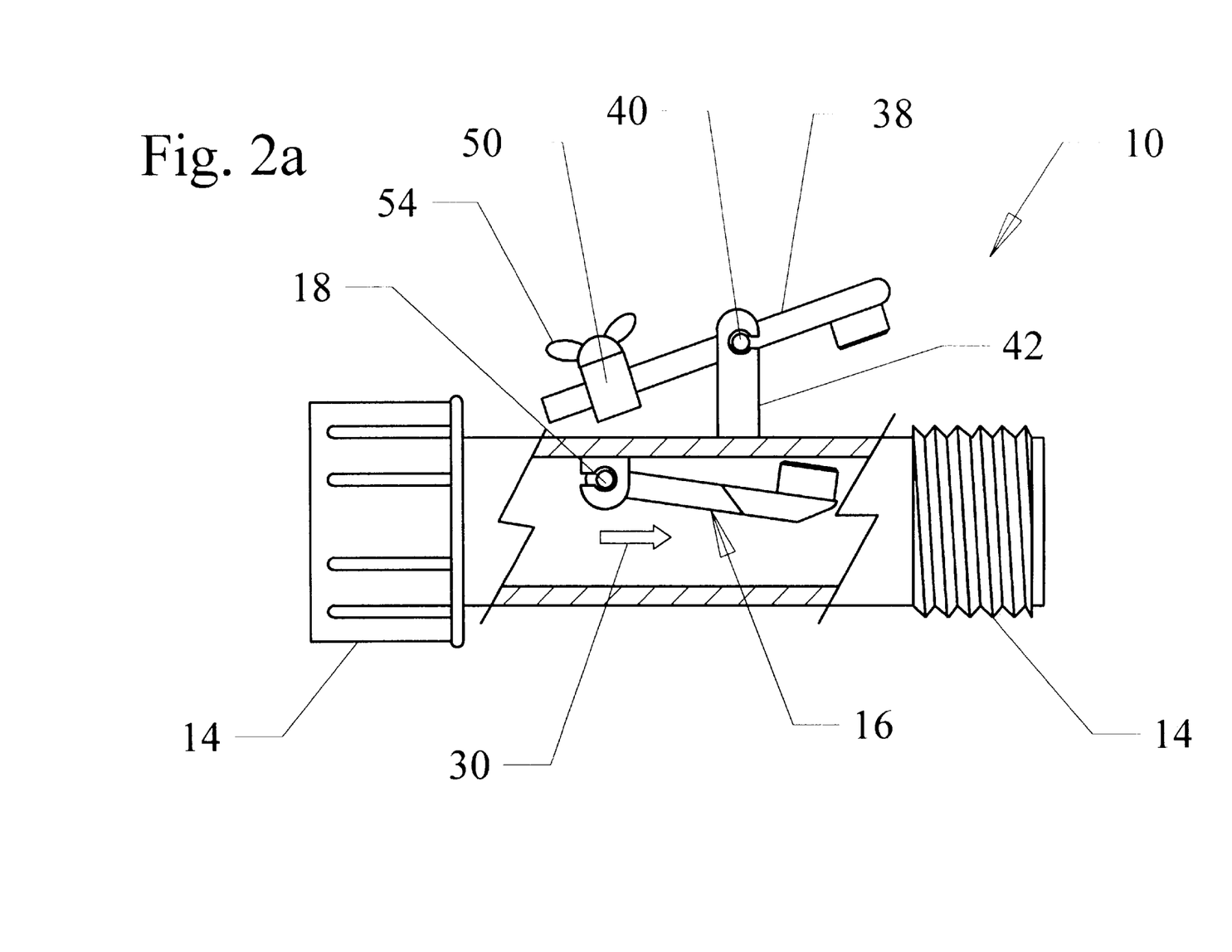
FIG. 2a is a side elevational view of the first embodiment of the flow meter shown in a high-flow condition.

The shape of flow paddle 16 in combination with its weight, including magnet 34, as pivoted about to pin 18 determines the fluid friction or resistance that paddle 16 presents to flow 30. A balance between this resistance and the mass or weight of paddle 16 determines an equilibrium position of paddle 16 with respect to its angular orientation about pin 18. Paddle 16 rotates in a counter-clockwise direction from the position shown in the FIG. 1a to assume an equilibrium position shown in FIG. 2a. Thus, FIG. 2a is a side elevational view of flow meter 10 in which flow paddle 16 has rotated to the maximum extent about pin 18 to assume a parallel or nearly parallel position to flow 30. The position of FIG. 2a would be assumed during flow rates at the extreme high and/or maximum of in-line flow meter 10. Similarly, flow paddle 16 assumes an intermediate position in the side elevational illustration of FIG. 3a at medium flow rates within the range of flow meter 10.

As shown in FIG. 1a in a first embodiment a flow indicator, generally referenced by reference 36, is provided exterior to body 12. Indicator 36 is comprised of an indicating lever 38 pivoted about a pin 40 in a fixture 42 connected to body 12. Again, as shown in FIG. 4, fixture 42 extends vertically from body 12 to define a pair of opposing flanges 44 between which pin 40 extends.

Figure 3A:
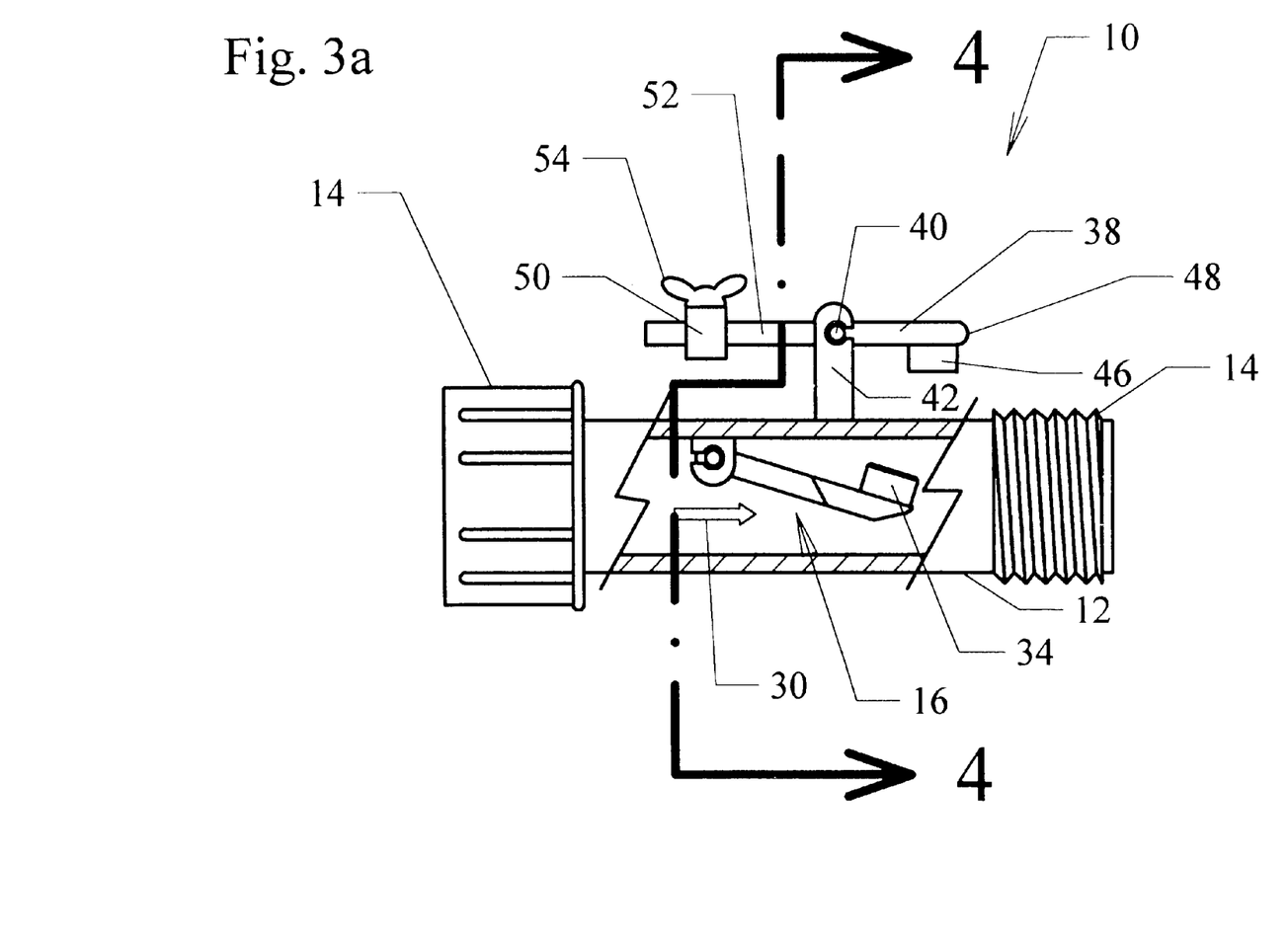
FIG. 3a is a side elevational view of the first embodiment of the flow meter shown in a medium-flow condition.

Indicator 36 has a permanent magnet 46 affixed to an end 48 of indicating lever 38 positioned on body 12, relative to flow paddle 16 so that magnets 34 and 46 mounted on flow paddle 16 and indicating lever 38 respectively magnetically interact. In other words, magnet 34 on flow paddle 16 may be disposed so that its north pole is facing outwardly and up toward upper surface 22 of body 12 where magnet 46 of indicating lever 38 is positioned. Magnet 46 has its magnetic poles oriented so they are opposing the magnetic orientation of magnet 34, namely, magnet 46 similarly has its north pole directed downwardly toward upper surface 22 of segment 10. In this way, as flow paddle 16 rotates in a counter-clockwise direction up toward upper surface 22 of body 12, magnet 34 repels magnet 46, causing indicating lever 38 to similarly rotate in a counter-clockwise direction as seen in FIGS. 1a, 2a, and 3a. In this manner, indicating lever 38 mimics or telegraphs the position of flow paddle 16 to an outside observer. Thus, in the illustration of FIG. 1a a low-flow condition will show indicating lever 38 in a position, when correctly adjusted as discussed below, that is in the fully clockwise rotated position for indicating lever 38. When the flow is maximal as shown in FIG. 2a, indicating lever 38 will then be rotated to or near the fully counter-clockwise rotated position achievable by indicating lever 38. At an intermediate position, as shown in FIG. 3a, indicating lever 38 will be in an intermediate position between positions shown on FIGS. 1a and 2a. In particular, when appropriately adjusted as discussed below, indicating lever 38 will be in a substantially level position when the flow is at the predetermined or normal rate.

Indicating lever 38 is provided with a counterweight 50 on the opposing portion 52 from end 48. Counterweight 50 may be a small slidable metal weight or plastic weight which is shown in the illustrations as adjustably tightened and fixed into position on portion 52 by means of a wing nut 54 or by a sliding leaf spring. The manner of temporary or selective fixation of weight 50 to portion 52 and its engagement with portion 52 is entirely a matter of design choice.

The position of paddle weight 50 on portion 52 of indicator 38 is chosen so that when the predetermined or pre-desired flow rate 30 is obtained within flow meter 10, weight 50 is adjusted such that indicator 38 assumes a predetermined angular orientation with respect to body 12. In the illustrated embodiment, weight 50 is adjusted so that indicator 38 is approximately level when flow 30 is at its desired rate. This allows a quick and easy visual determination then to be made on whether the flow rate is above or below the predetermined or desired rate. Observation of indicator 38 will then quickly provide an indication of whether the flow 30 is too low, in which case end 48 will have been rotated downwardly and portion 52 rotated upwardly with wing nut 54 serving as a flag, which is raised up when low flow is obtained.

Similarly, if the drip lines are breached and the flow rate is higher than desired, indicator 38 will tend to assume the position such as shown in FIG. 2a, in which weight 50 and its wing nut 54 has rotated downwardly, providing a flagged indication of higher than desired flow.

It is anticipated that the position of counterweight 50 will have to be individually adjusted in the field in every installation since the amount of flow will vary depending upon the number of drip lines and the length of the line. In addition, it may become necessary to make adjustments over the course of time in an irrigation line since the cumulative affect of small changes in drip rates as the lines age can be expected to change. Flow meter 10 according to the invention is sufficiently sensitive to provide the extreme indicators as shown between FIGS. 1a and 2a when a single submain line is breached or clogged and the supply system that covers 40 acres or more.

Figure 1B:
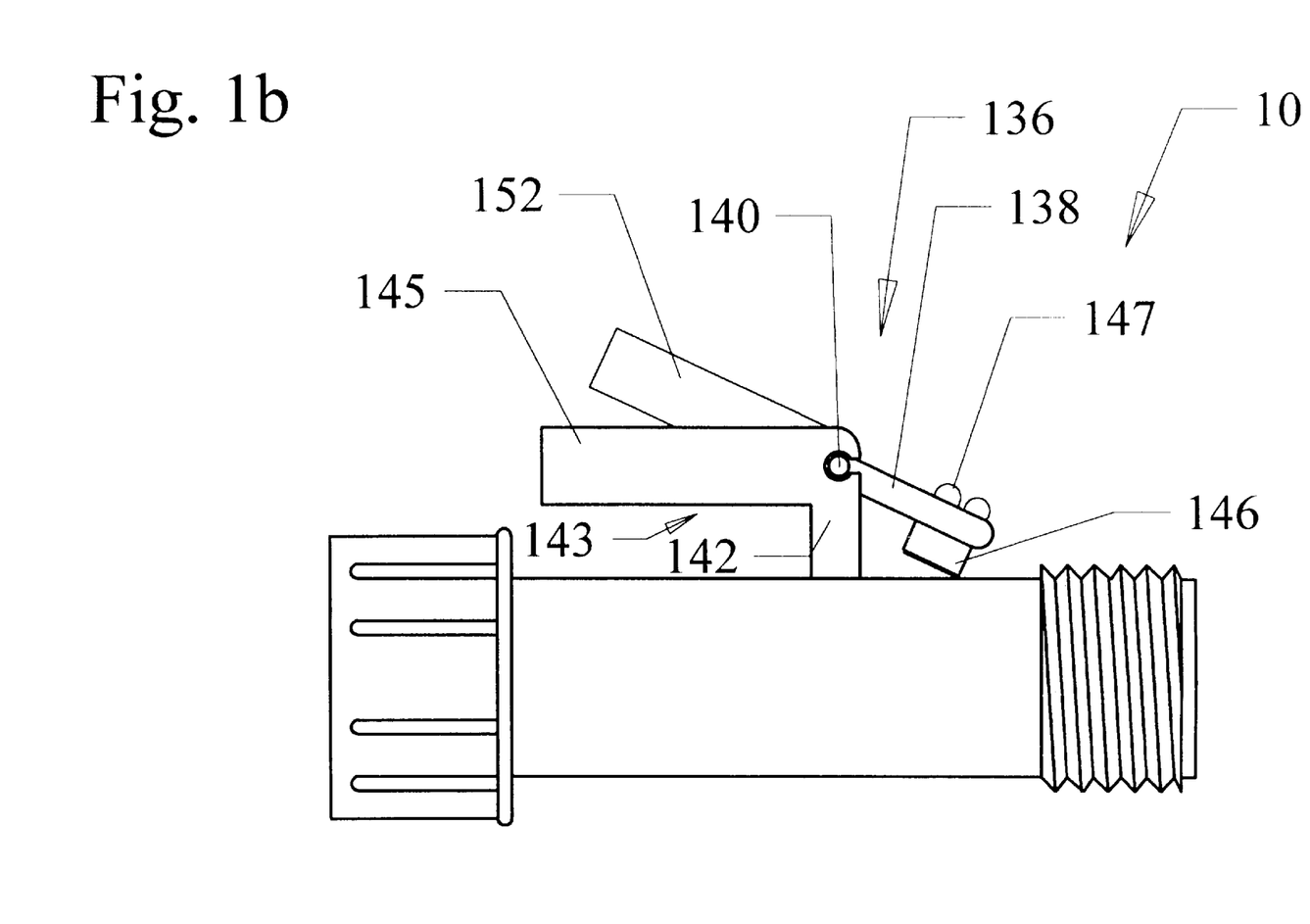
FIG. 1b is a side elevational view of a second embodiment of the indicator portion of the flow meter shown in a no or low-flow condition.
Figure 2B:
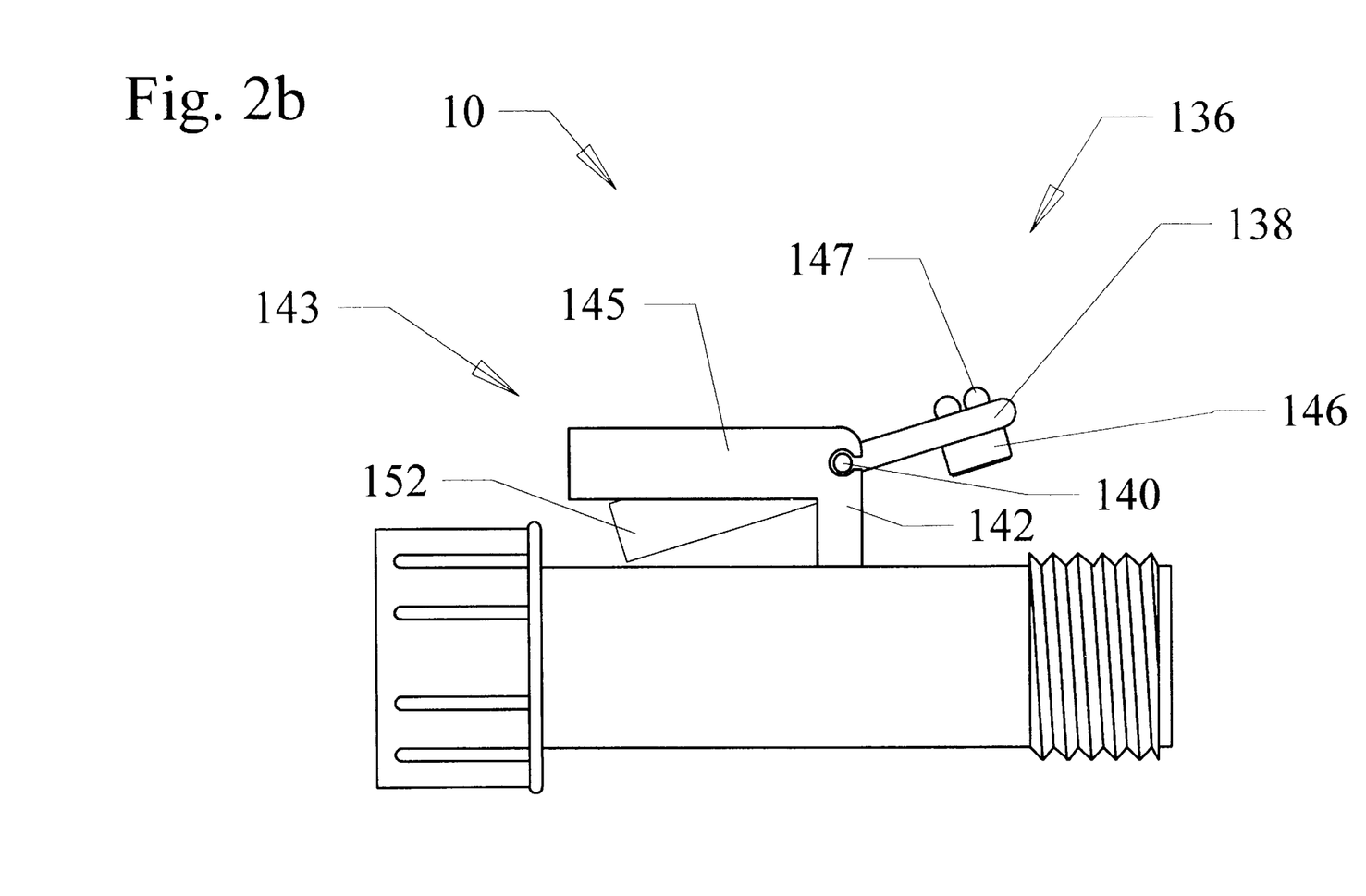
FIG. 2b is a side elevational view of the indicator portion of the second embodiment of the flow meter shown in a high-flow condition.
Figure 3B:
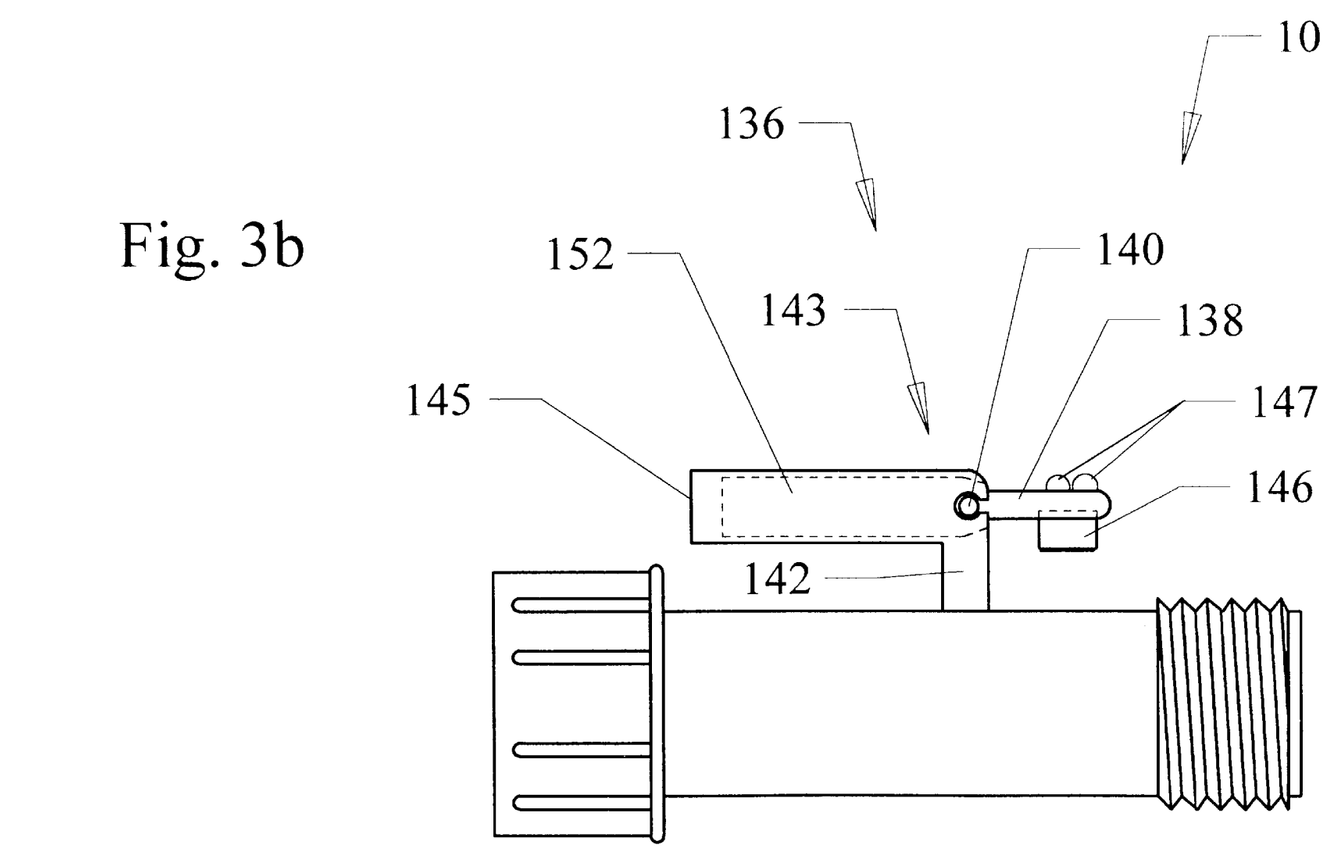
FIG. 3b is a side elevational view of the indicator portion of the second embodiment of the flow meter shown in a medium-flow condition.

FIGS. 1b, 2b, and 3b are corresponding side elevational views of a second embodiment of the invention, whose advantages will become apparent in the following. The embodiment of FIGS. 1b–3b, 7 and 8 illustrate the presently preferred embodiment which is identical to the flow meter as described in connection with FIGS. 1a, 2a, and 3a except that indicator 36 has been replaced by indicator 136 of the embodiment of FIGS. 1b, 2b, 3b, 7 and 8. All other elements of the flow meter are otherwise identical and hence with respect to these two embodiments only the differences in indicators 36 and 136 will be described. Indicator 136 is comprised of the stationary support or bracket 143, which includes an integrally formed shield portion 145 in the shape of an "L," as seen in the side view of FIGS. 1b, 2b, and 3b. The stem of the "L" is a vertical support 142 which is connected to conduit 12. Lever 38 in indicator 36 is replaced by lever or sensor arm 138 in indicator 136, carrying a permanent magnet 146 at its distal end, corresponding to magnet 46 of indicator 36. Arm 138 is rotatably coupled to a flag portion or lever 152, corresponding to portion 52 of indicator 36. However, lever 152 is a separate piece which is rotatably coupled to lever 138 and is flattened and fabricated from a different colored material, such as red plastic, to enhance its visibility relative to black plastic shield 145. As best seen in the top plan view of FIG. 7, flag portion 152 is thinned so it easily slides within a mating slot 153 within shield 145. The width of shield 145 is at least as broad as the width of lever 152, so that when lever 152 is completely disposed within slot 153 as shown in FIG. 3b in side view, little or no portion of lever 152 will be visible or extend out of slot 153 of shield 145.

Figure 8:
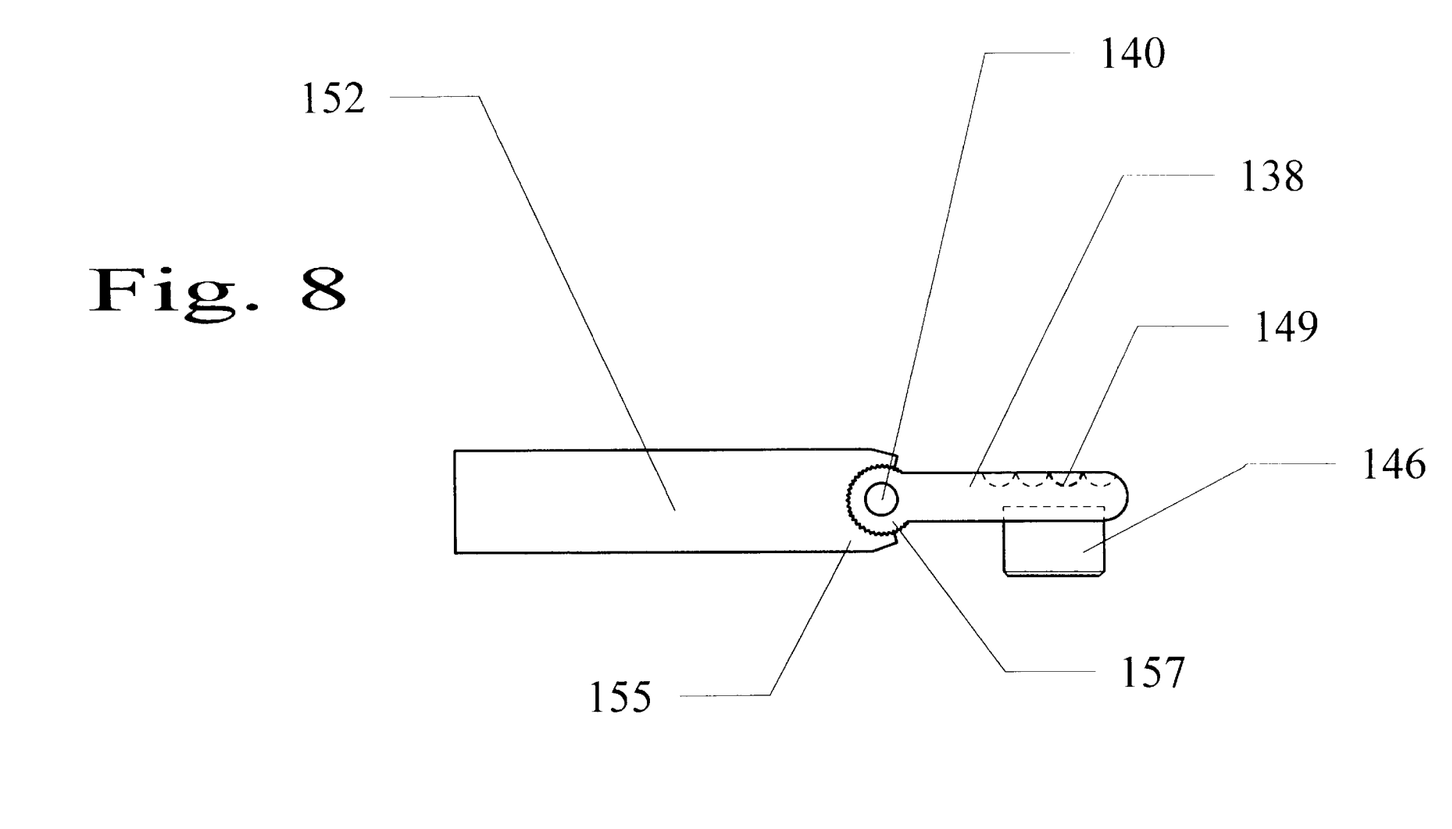
FIG. 8 is a side elevational view of the sensor arm and indicating lever of the embodiment of FIG. 7.

As best seen in the side elevational view of FIG. 8, which is a depiction of sensor arm 138 and indicator lever 152, shown in isolation and apart from its rotatable coupling in and disposition within bracket 143, arm 138 is rotatably coupled to lever 152. Thus, both arm 138 and lever 152 rotate about pin 140. The coupling portion 155 of lever 152 is modified so that it resiliently clasps a cylindrical bushing or terminus 157 formed as part of arm 138. The interior surface of coupling portion 155 and the exterior surface of terminus 157 of arm 138 are both provided with ridges or a plurality of conforming detent surfaces to retain the angular orientation of lever 152 with respect to arm 138 among a plurality of engageable or ratcheted positions.

Lever 152 thus acts not only as an indicating flag to provide a clear visual indication of the angular orientation of arm 138, and hence the rate of fluid flow within the flow meter 10, but also as a counterweight which can be adjusted in the field. For example, in addition to balancing arm 138 and magnet 146, if the normal flow or the orientation of flow meter 10 is such that normal flow leaves arm 138 in anything other than a level or parallel position with respect to conduit 12, the angular orientation between lever 152 and 138 can be adjusted so that lever 152 is entirely concealed within slot 153 of shield 145 as shown in FIG. 3b. Thus, the flow rate need not be of such a magnitude as to leave sensing arm 138 in a parallel or any other predetermined position in order to also leave lever 152 in a parallel or concealed position within shield 15 thus indicating normal flow.

Although angular adjustment of lever 152 with respect to sensor arm 138 will also slightly affect the counter-balance of arm 138, the effect is small. Therefore, counterweights in the form of BB's or ball bearings 147 are placed in indentations 149 defined in the opposing surface of arm 138 opposite magnet 146. Two such BB's 147 are shown in the illustration FIGS. 1*b*, 2*b*, and 3*b* with the BB's removed from the illustration of FIG. 8. The magnetic force of magnet 146 is sufficient to securely maintain BB's 147 in the selected indentations 149. The number as well as the positioning of BB's within indentations 149 provide a field adjustable counterweight to provide for further flow range adjustments. The plurality of indentations 149 may be employed in the preferred embodiment as shown in the top elevational view of FIG. 7, the plurality of indentations 149 provided along the line of arm 138 are generally perpendicular to the axis of pivot 140 to allow for selectively adjusting a counter-balancing torque about pivot 140 depending upon the position of indentation 149 selected. Thus, BB's 147 may be used not only to compensate for inclined positions in which flow meter 10 may have to be used, but more significantly to provide adjustments in the range of flow rates spanned between maximal and minimal indications of flow meter 10.

Relative placement of magnets 34 and 46 with respect to each other during their swing can be adjusted longitudinally by replacement of their corresponding pivots to vary the strength of the magnetic interaction. For example, if the position of magnet 34 on paddle 16 is chosen to be longitudinally displaced along the axis of conduit 12 so that its closest point of approach is spaced apart from the closest point of approach of magnet 46 to conduit 12, then a linear and smooth response is obtained between the swing of lever arm 26 and the swing of lever arm 38. Thus, there is a relative position of pivots 18 and 40 or 18 and 140 which allows the flow meter 10 to be approximately linear in its response.

However, as a separation of the end-points of the swing of magnets 34 and 46 or 146 next to conduit 12 is decreased, there comes a point in which the magnets interact as if they were an over-the-center toggle. In other words, instead of providing a smooth linear response to the swing of magnet 34, the sensing magnet 46 or 146 tends to toggle nonlinearly between its maximum and minimal swing positions as shown in FIGS. 1*a*, 1*b* and 3*a*, 3*b* respectively. Therefore, the adjustment between the pivot points for magnets 34 and 46 or 146 can be chosen according to the desired end result, namely whether detection of a threshold flow is desired or whether a more linear high-normal-low flow indication is needed.

Flow meter 10 is intended to operate using a balance between the gravitational and magnetic forces on levers 16 and 38 or 138. Therefore, flow meter 10 is preferably used in a level position in which there is neither an exaggerated front -to-back pitch or a side-to-side roll. Any type of bracket or stabilizer may thereby be combined with flow meter 10 to maintain the flow meter in an approximately aligned or upright position. For example, as shown in FIG. 4, a wire clip, generally denoted by reference numeral 61 is attached to conduit 12 and includes flexible arm 63, extending to each side, which can be bent or positioned to achieve an approximate upright position, namely one in which the conduit 12 is not rotated significantly to one side or the other. A second clip or bend in flexible arm 63 in the longitudinal direction can also be used to correct front-to-back pitch inclinations if flow meter 10 is installed on a slope.

There are many equivalent types of fixtures or means by which flow meter 10 may be stabilized or its attitude adjusted. For example, an adjustable fixture may also be provided which includes a stake which is pounded into the ground on one end, and then adjustably attached to conduit 12 on the other, with the fixture being bent or adjusted to leave conduit 12 in the desired attitude. Such a stake fixture may also be helpful in providing added elevation and visibility to flow meter 10.

Figure 5:
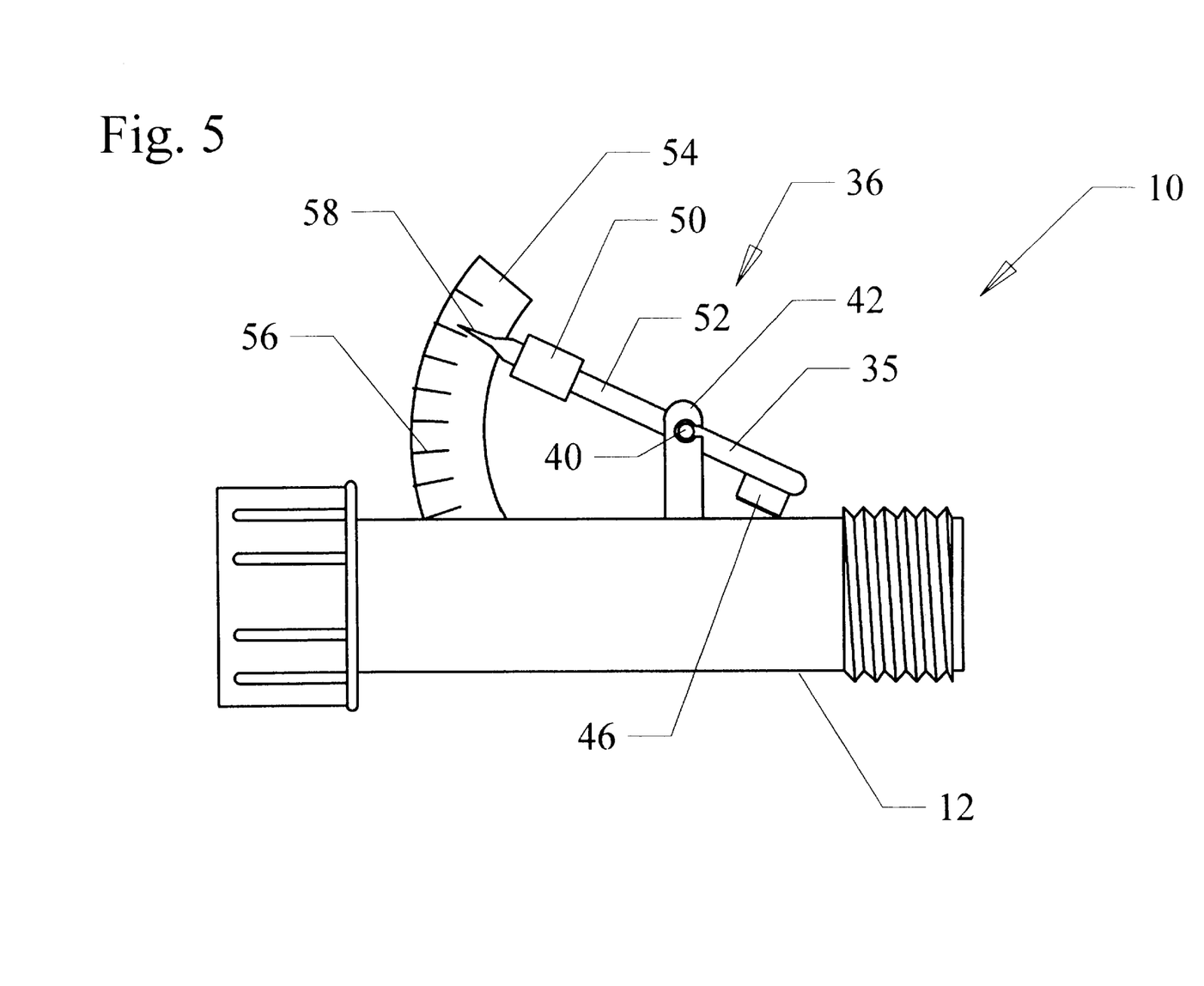
FIG. 5 is a side elevational view of another embodiment wherein an indicia scale has been added to provide a continuously variable visual output reading.

Although the present invention has been shown as a tristated in-line flow meter, it should also be apparent that the flow indication provided by flow meter 10 is continuous and analog across its entire range. In other words, flow meter 10 is capable of an infinite number of flow gradation indications not just simply the three as shown in FIGS. 1*a* and *b*–3*a* and *b*. In the event that a proportional output is desired, it is possible to further modify the invention by providing a graduated scale or an indicia plate against which indicator 38 would be positioned. In this manner, graduated or calibrated flow rates, whatever they may be, would be visually absorbable. The side elevational view of FIG. 5 showing just indicator 36 depicts an enlargement of a fixed indicia plate 54, having a plurality of indicia marks 56 on it. Indicia plate 54 extends and is connected to body 12 and is positioned so that the end 58, which has been narrowed to form a needle, overlaps indicia marks 56.

Figure 6:
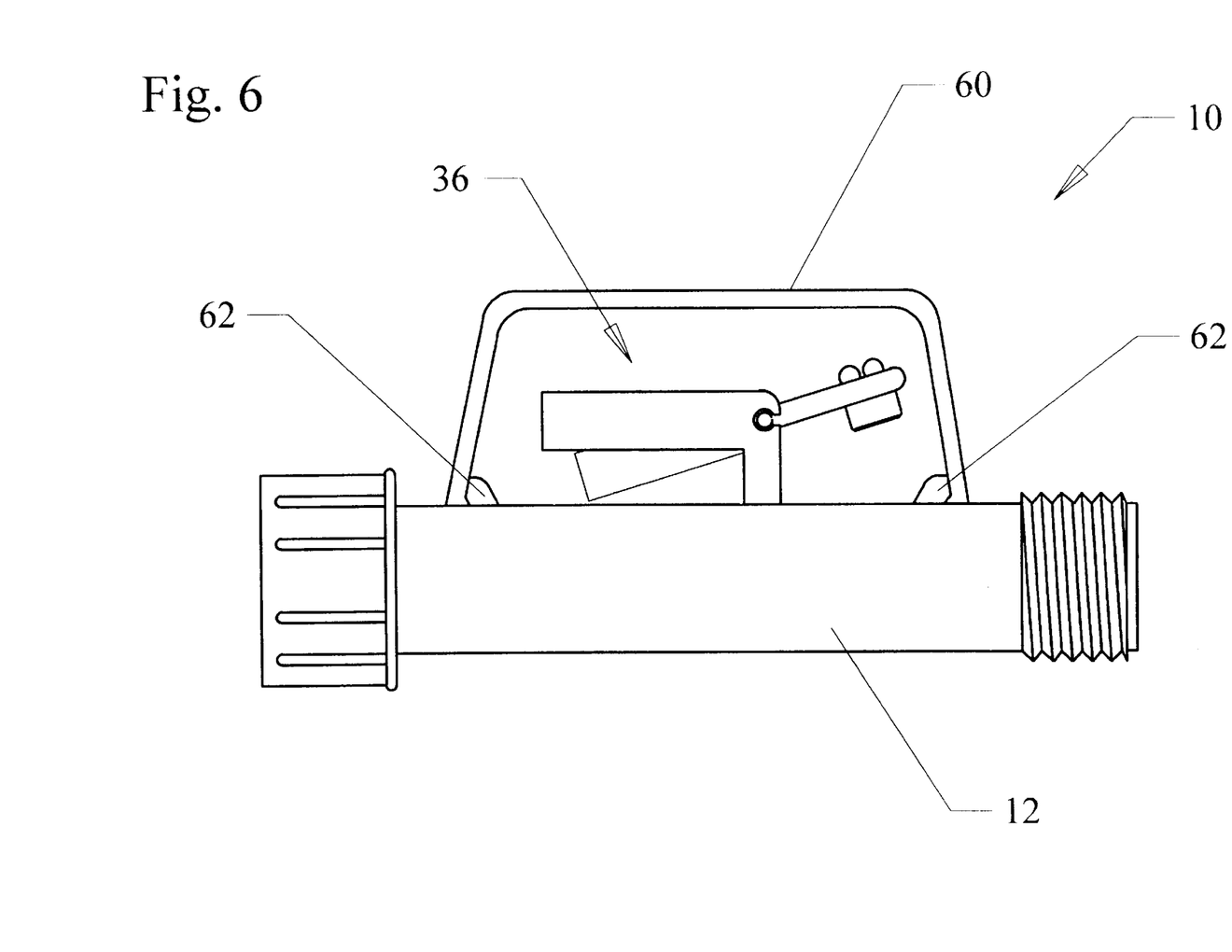
FIG. 6 is a side cross-sectional view taken along the longitudinal axis of the flow meter of another embodiment wherein a protective dust cover has been added.
Figure 7:
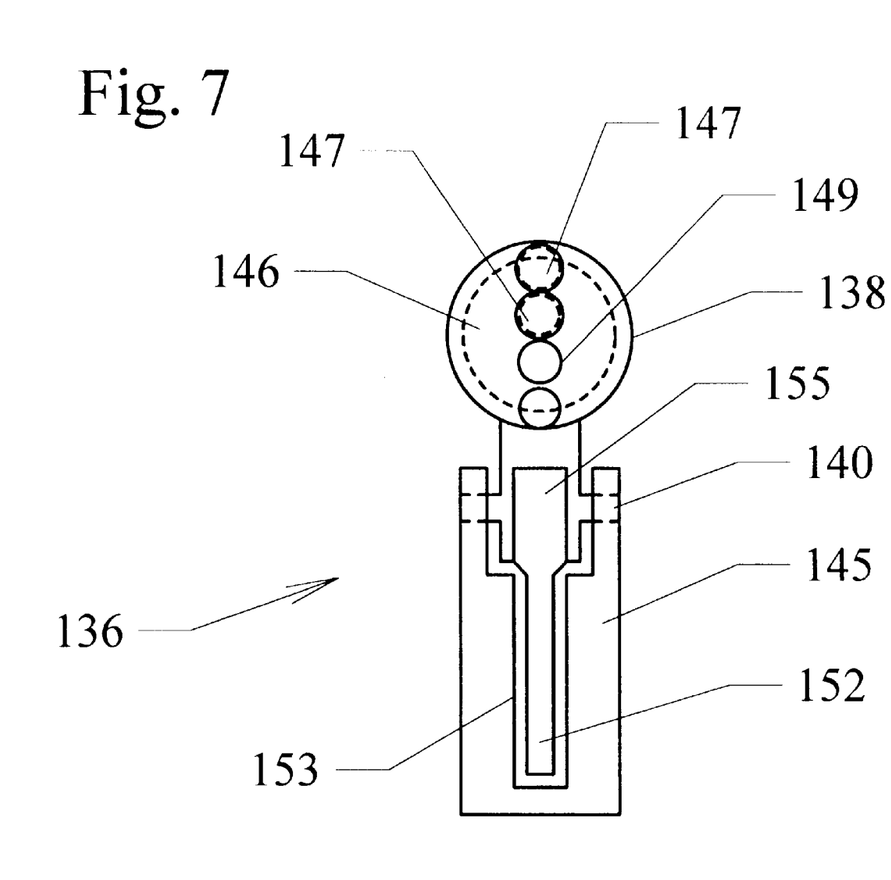
FIG. 7 is a top plan view of a second embodiment of the indicator shown in isolation of the other elements of the flow indicator.

Another embodiment as shown in FIG. 6 is where indicator 36 is again shown in isolation of the other elements of flow meter 10. Indicator 36 has been provided with a transparent dust cover 60 which snap fits to a molded bar 62 defined on and extending from body 12. Instead of snapping on a molded bar 62, dust cover 60 may be designed to have tabs or edges which snap into longitudinal grooves (not shown) defined in the side of conduit 12. Dust cover 60 is also provided with one or more breather holes or gaps so that humidity and temperature is equalized across dust cover 60 to prevent internal fogging and visual obscuration. Dust cover 60 provides not only protection of indicator 36 from dust, dirt, grime and other debris which might otherwise interfere with its operation, but dust cover 60 also provides physical protection to indicator 36, since flow meter 10 is used in the field and is subjected to a potential for physical abuse which might cause damage to indicator 36 if it were left unprotected.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A flow meter comprising:
   a body for providing a conduit of fluid flow;
   a rotatable paddle disposed in said fluid flow within said body;
   a permanent magnet disposed on said paddle;
   a rotatable indicator disposed outside of said body, vertically disposed on said body above said paddle and disposed so as to be visually accessible; and
   a second permanent magnet disposed on said indicator, said second permanent magnet positioned and oriented on said indicator to magnetically oppose said permanent magnet disposed upon said paddle so that the level of fluid flow through said body relative to a field-adjusted null position is indicated by the position of said indicator exterior to said body.

2. The flow meter of claim 1 wherein said rotatable paddle has an arm with opposing ends, has a paddle surface provided at one end and a pivotal coupling positioned at opposing end of said arm.

3. The flow meter of claim 2 wherein said pivotal end of said arm is rotatably coupled to an interior upper surface of said body.

4. The flow meter of claim 2 wherein said paddle surface is shovel-shaped.

5. The flow meter of claim 4 wherein said shovel shape paddle surface has a leading faceted surface oriented towards said flow within said body.

6. The flow meter of claim 1 wherein said indicator comprises opposing ends, said second permanent magnet being disposed on one of said ends, said indicator being pivoted at a point between said two ends, said one end on which said second permanent magnet is disposed having temporary weights disposed thereon by which flow ranges of said flow meter in which said null position may be provided are field adjustable.

7. The flow meter of claim 6 wherein said indicator further comprises an arm upon which said second permanent magnet is disposed and a counterweight coupled to said arm for balancing said second permanent magnet, said counterweight coupled to said arm on an opposing side of said pivoted coupling opposing said second magnet, said counterweight being field adjustable so that said indicator may be adjusted to assume a null position in response to a corresponding predetermined flow within said body.

8. The flow meter of claim 7 wherein said counterweight is adjusted so that said arm is approximately parallel with said body when a predetermined normal flow within said body is achieved.

9. The flow meter of claim 7 wherein said counterweight has a first color, the flow meter further comprising a shield with a second color different from said first color, said counterweight being substantially concealed by said shield when a predetermined normal flow within said body is achieved.

10. The flow meter of claim 1 further comprising a fixed indicia scale disposed on said body and positioned relative to said indicator to provide a visual quantitative continuous readout of position of said indicator.

11. The flow meter of claim 1 further comprising a protective transparent cover disposed on said body to enclose and protect said indicator while permitting visual observation thereof.

12. An in-line flow meter comprising:
    a cylindrical segment for receiving fluid flow;
    a paddle pivoted on one end and disposed within said cylindrical segment within said flow within said segment, said pivoted paddle having a permanent magnet disposed on its lower end opposing said pivoted end and assuming an angular orientation with respect to said pivoted end dependent upon the magnitude of flow within said cylindrical segment; and
    an indicator mounted vertically on said cylindrical segment exterior to the interior of said cylindrical segment above said paddle and being pivoted between its two opposing ends, one of said ends having a second permanent magnet disposed thereon in a position of magnetic opposition with said first permanent magnet disposed on said paddle so that said indicator assumes a position about its pivot in response to the position of said paddle within said cylindrical segment, thus indicating flow rate within said in-flow meter relative to a field-adjusted null position.

13. The in-line flow meter of claim 12 wherein said indicator further comprises an arm and a counterweight coupled to said arm, said counterweight being adjustable in the field to allow orientation of said indicator about its pivot to be adjusted to a predetermined orientation of said paddle by its pivot corresponding to a predetermined flow rate within said cylindrical segment.

14. The in-line flow meter of claim 13 wherein said counterweight comprises a first color, the in-line flow meter further comprising a shield with a second color different from said first color, said counterweight being substantially concealed by said shield when said predetermined flow rate within said cylindrical segment is achieved.

15. The in-line flow meter of claim 12 further comprising a protective cover disposable on said cylindrical segment and enclosing said indicator.

16. The in-line flow meter of claim 15 wherein said protective cover includes at least a transparent portion allowing visual observation of said indicator exterior to said cover.

17. The in-line flow meter of claim 12 wherein said one end of said indicator on which said second permanent magnet is disposed has temporary weights disposed thereon by which flow ranges of said in-line flow meter in which said null position may be provided are field adjustable.

18. A method of providing an in-line flow rate visual indication comprising the steps of:
    flowing fluid in a conduit past a first pivoted lever disposed in said flowing fluid, said first pivoted lever having a flow resisting surface at one end and being pivoted to said conduit at an opposing end of said first pivoted lever;
    rotating said first pivoted lever about said pivot depending upon magnitude of flow within said conduit, said first pivoted lever having at least in part a permanent magnetic portion; and rotating a second pivoted lever disposed exterior to said conduit and vertically above said first pivoted lever, and having a second permanent magnetic portion, said second pivoted lever being rotated in response to rotation of said first pivoted lever to provide a visual indication of magnitude of flow within said conduit, said second pivoted lever being rotated in response to a repulsive magnetic force exerted between said magnetic portions of said first and second pivoted levers in opposition to gravity, said second pivoted lever capable of assuming at least two positions indicative of minimal and maximal flow within said conduit relative to a field-adjusted null position.

19. The method of claim 18 wherein flowing fluid in said conduit is characterized by a range of measurable flow rates of said fluid and further comprising the step of adjusting a counterweight on said second pivoted lever to field adjust the range of flow rate within said conduit in which said null position may be provided.

20. A flow meter comprising:

a body for providing a conduit of fluid flow;

a first rotatable lever disposed in said fluid flow within said body;

a permanent magnet disposed on said first lever;

a second rotatable lever disposed outside of said body;

a second permanent magnet disposed on said second lever, said second permanent magnet positioned and oriented on said second lever to magnetically oppose said permanent magnet disposed upon said first lever so that the position of said first lever within said flow within said body is followed by the position of said second lever exterior to said body; and an adjustable third lever rotatably coupled to said second lever to provide a visual indication of position of said second lever and to provide an adjustable counterbalance thereto.

21. The flow meter of claim 20 further comprising a shield for providing a visual alignment indicator with said third lever.

* * * * *